United States Patent
Eo et al.

(10) Patent No.: US 11,060,585 B2
(45) Date of Patent: Jul. 13, 2021

(54) DCT FOR VEHICLE

(71) Applicants: Hyundai Motor Company, Seoul (KR); Kia Motors Corporation, Seoul (KR)

(72) Inventors: Soon Ki Eo, Ansan-si (KR); Seong Wook Hwang, Gunpo-si (KR); Won Min Cho, Hwaseong-si (KR); Min Ho Chae, Incheon (KR); Sun Sung Kwon, Anyang-si (KR); Chon Ok Kim, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 156 days.

(21) Appl. No.: 16/513,056

(22) Filed: Jul. 16, 2019

(65) Prior Publication Data

US 2020/0271196 A1   Aug. 27, 2020

(30) Foreign Application Priority Data

Feb. 22, 2019   (KR) .................. 10-2019-0021028

(51) Int. Cl.
*F16H 37/06* (2006.01)
*F16H 3/085* (2006.01)
*F16H 3/00* (2006.01)

(52) U.S. Cl.
CPC ............ *F16H 3/085* (2013.01); *F16H 3/006* (2013.01); *F16H 2200/0008* (2013.01); *F16H 2200/0052* (2013.01)

(58) Field of Classification Search
CPC .. F16H 3/085; F16H 3/006; F16H 2200/0052; F16H 2200/0008
See application file for complete search history.

(56) References Cited

U.S. PATENT DOCUMENTS

| | | | |
|---|---|---|---|
| 7,748,286 B2 * | 7/2010 | Baldwin | F16H 3/006 74/330 |
| 8,720,290 B2 * | 5/2014 | Baldwin | F16H 3/006 74/330 |
| 9,297,443 B2 * | 3/2016 | Lee | F16H 3/087 |
| 10,156,282 B2 * | 12/2018 | Lee | F16H 3/085 |
| 10,234,000 B2 * | 3/2019 | Lee | F16H 3/006 |
| 2007/0199393 A1 * | 8/2007 | Hattori | F16H 3/006 74/331 |

FOREIGN PATENT DOCUMENTS

KR   10-2010-0088731 A   8/2010

* cited by examiner

*Primary Examiner* — Jake Cook
(74) *Attorney, Agent, or Firm* — Morgan, Lewis & Bockius LLP

(57) ABSTRACT

A double clutch transmission (DCT) may include a first input shaft and a second input shaft disposed to or not to receive power from the same power source, respectively; a first output shaft and a second output shaft each disposed in parallel with the first input shaft; a first drive gear disposed on and rotated with the first input shaft; a second drive gear disposed on and rotated with the second input shaft; a first driven gear engaged with the first drive gear and rotatably disposed on a selection output shaft which is one of the first output shaft and the second output shaft; a second driven gear engaged with the second drive gear and rotatably disposed on the selection output shaft; and a sleeve synchronizer selectively connecting between the first driven gear and the second driven gear.

5 Claims, 5 Drawing Sheets

DCT FOR VEHICLE

CROSS REFERENCE TO RELATED APPLICATION

The present application claims priority to Korean Patent Application No. 10-2019-0021028 filed on Feb. 22, 2019, in the Korean Intellectual Property Office, the entire contents of which is incorporated herein for all purposes by this reference.

BACKGROUND OF THE INVENTION

Field of the Invention

The present invention relates to a double clutch transmission (DCT) for a vehicle, and more particularly, the present invention relates to a technique related to a DCT structure that can reduce the whole length relatively while implementing a plurality of shift ranges.

Description of Related Art

In a front engine front drive (FF) vehicle, in many cases, an engine and a transmission are combined to form an assembly in the lateral direction of the vehicle. In the instant case, since the whole length of the assembly of the engine and transmission may be received within the width in a lateral direction of an engine compartment of the vehicle, the whole length reduction of the assembly of the engine and transmission is one of the most important goals in powertrain design.

On the other hand, since the output and fuel efficiency characteristics vary greatly depending on the operating region of the engine, it is desirable to operate the engine in the optimum operating region as much as possible. To achieve this, a transmission connecting the engine and the drive wheels may be configured for providing as many shift ranges as possible.

Generally, as the shift ranges which may be provided by the transmission increases, the whole length of the transmission becomes longer. Therefore, the shift ranges increase of the transmission and the vehicle mountability has a tradeoff relationship which is incompatible with each other.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a DCT for a vehicle configured for providing a plurality of shift ranges and having a relatively short total length to improve fuel efficiency of a vehicle and ensuring vehicle mountability.

A DCT for a vehicle of the present invention in order achieve the above objects may include a first input shaft and a second input shaft configured to change states receiving power from the same power source, respectively; a first output shaft and a second output shaft each disposed in parallel with the first input shaft; a first drive gear disposed on and rotated with the first input shaft; a second drive gear disposed on and rotated with the second input shaft; a first driven gear engaged with the first drive gear and rotatably disposed on a selection output shaft which is one of the first output shaft and the second output shaft; a second driven gear engaged with the second drive gear and rotatably disposed on the selection output shaft; and a sleeve synchronizer selectively connecting between the first driven gear and the second driven gear.

The selection output shaft on which the first driven gear and the second driven gear are disposed may be provided with a first synchronizer which can connect or disconnect the first driven gear to or from the selection output shaft; and a second synchronizer which can connect or disconnect the second driven gear to or from the selection output shaft.

The first input shaft and the second input shaft may be provided with at least one drive gear for a shift range, respectively; and at least one of the first output shaft and the second output shaft is provided with a plurality of driven gears for a shift range which are engaged with the drive gears for the shift range to form respective shift range.

The at least one drive gear for the shift range may be disposed on and rotated with the first input shaft or the second input shaft; the plurality of driven gears for the shift range may be disposed on the first input shaft or the second input shaft to be rotatable; and the first output shaft or the second output shaft may be provided with a synchronizer for a shift range which can connect or disconnect the driven gear for the shift range.

The drive gears for the shift range and the driven gears for the shift range may be provided to form remaining shift ranges except for a lowest shift range and a highest shift range among the entire shift ranges which may be implemented by the DCT; and the lowest shift range and the highest shift range may be implemented by the drive gears for the shift range and the driven gears for the shift range in a state of connecting the first driven gear to the second driven gear by the sleeve synchronizer.

The selection output shaft may be the second output shaft; and when implementing the lowest shift range, the power transmitted from the first input shaft is transmitted to the second input shaft through the first driven gear and the second driven gear and then, transmitted to the first output shaft through any one of the drive gears for the shift range disposed on the second input shaft and the driven gears for shift range engaged with the drive gears for the shift range.

The selection output shaft may be the second output shaft; and when implementing the highest shift range, the power transmitted from the second input shaft is transmitted to the first input shaft through the second driven gear and the first driven gear and then, transmitted to the first output shaft through any one of the drive gears for the shift range disposed on the first input shaft and the driven gears for shift range engaged with the drive gears for the shift range.

The first drive gear and the first driven gear, the second drive gear and the second driven gear may be respectively configured to form any one of shift range among remaining shift ranges except for the lowest shift range and the highest shift range.

The first input shaft or the second input shaft may be provided with at least one drive gear for a shift range; and at least one of the first output shaft and the second output shaft may be provided with driven gears for a shift range which are engaged with driven gears for the shift range to form a shift range.

The drive gears for shift range may be disposed on and rotated with the first input shaft or the second input shaft; the driven gears for the shift range may be disposed on the first output shaft or the second output shaft to be rotatable; and the first output shaft or the second output shaft may be provided with a synchronizer for a shift range for selectively connecting the driven gears for the shift range.

The drive gears for the shift range and the driven gears for the shift range may be provided to form remaining shift ranges except for a lowest shift range and a highest shift range among the entire shift ranges which may be implemented by the DCT; and the lowest shift range and the highest shift range may be implemented by the drive gears for the shift range and the driven gears for the shift range in a state of connecting the first driven gear to the second driven gear by the sleeve synchronizer.

The DCT of the vehicle of the present invention can provide a plurality of shift ranges and configure a relatively short whole length of the transmission, improving vehicle mountability of the transmission and ultimately contributing to the improvement of fuel efficiency of the vehicle by providing a plurality of shift ranges.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
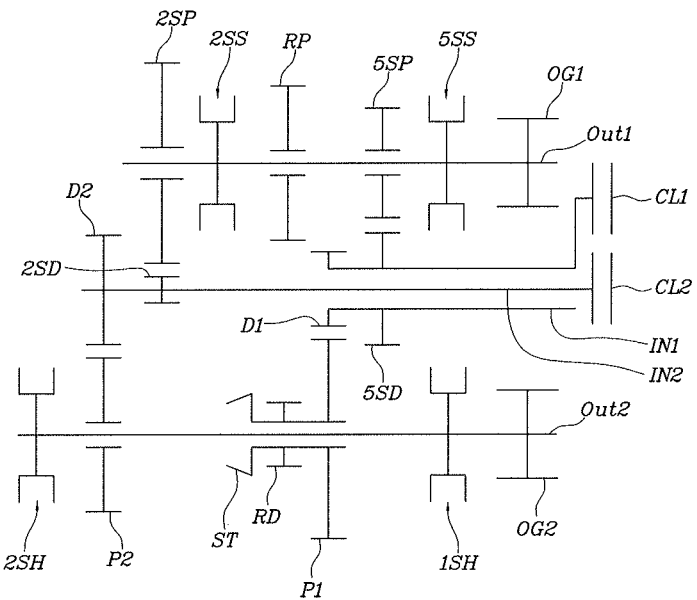
FIG. 1 is a drawing showing the various exemplary embodiments of a DCT for a vehicle according to an exemplary embodiment of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

An exemplary embodiment of the present invention will be described in detail with reference to the attached drawing as follows.

Referring to FIG. 1 to FIG. 8, the various exemplary embodiments of a DCT for a vehicle according to an exemplary embodiment of the present invention is configured to include, a first input shaft IN1 and a second input shaft IN2 configured to change states receiving power from the same power source, respectively; a first output shaft OUT1 and a second output shaft OUT2 disposed in parallel with the first input shaft IN1; a first drive gear D1 disposed on and rotated with the first input shaft IN1; a second drive gear D2 disposed on and rotated with the second input shaft IN2; a first driven gear P1 engaged with the first drive gear D1 and rotatably disposed on a selection output shaft which is one of the first output shaft OUT1 and the second output shaft OUT2; a second driven gear P2 engaged with the second drive gear D2 and rotatably disposed on the selection output shaft; and a sleeve synchronizer ST selectively connecting between the first driven gear P1 and the second driven gear P2.

The first input shaft IN1 and the second input shaft IN2 may be a connection state of providing or receiving power between each other sequentially through the first drive gear D1, the first driven gear P1, the sleeve synchronizer ST, the second driven gear P2 and the second drive gear D2, and the connection state of the first input shaft IN1 and the second input shaft IN2 may be released by the sleeve synchronizer ST.

The first input shaft IN1 is configured to receive power from the power source through a first clutch CL1, and the second input shaft IN2 is configured to receive power from the power source through a second clutch CL2.

The first input shaft IN1 may be formed of a hollow shaft into which the second input shaft IN2 is inserted, the first output shaft OUT1 may be provided with a first output gear OG1 for drawing out power, and the second output shaft OUT2 may be provided with a second output gear OG2 for drawing out power.

The first output gear OG1 and the second output gear OG2 is configured to engage with a ring gear of a differential, respectively, to draw out power to driving wheels.

The first input shaft IN1 and the second input shaft IN2 may be provided with at least one drive gear for shift ranges, respectively, and at least one of the first output shaft OUT1 and the second output shaft OUT2 may be provided with a plurality of driven gears for the shift range which are engaged with the drive gears for the shift range to form respective shift range.

The drive gears for the shift range may be disposed on and rotated with the first input shaft IN1 or the second input shaft IN2, the driven gears for the shift range may be disposed on the first output shaft OUT1 or the second output shaft OUT2 to be rotatable, and the first output shaft OUT1 or the second output shaft OUT2 may be provided with a synchronizer for shift range for selectively connecting the driven gears for the shift range.

That is, in the exemplary embodiment of the present invention, the first input shaft IN1 may be provided with a drive gear for a fifth range 5SD, the second input shaft IN2 may be provided with a drive gear for a second range 2SD, the first output shaft OUT1 may be provided with a driven gear for a fifth range 5SP engaged with the drive gear for the fifth range 5SD and a driven gear for a second range 2SP engaged with the drive gear for the second range 2SD, and the first output shaft OUT1 may be provided with a synchronizer for the fifth range 5SS which connects the driven gear for the fifth range 5SP to the first output shaft OUT1 to implement the fifth range and a synchronizer 2SS for the second range which connects the driven gear 2SP for the second range to the first output shaft OUT1 to implement the second range.

Of course, the drive gear 2SD for the second range and the drive gear for the fifth range 5SD belong to the drive gear for the shift range, the driven gear for the second range 2SP and the driven gear for the fifth range 5SP belong to the driven gear for the shift range, and the synchronizer for the second range 2SS and the synchronizer for the fifth range 5SS belong to the synchronizer for the range.

In the exemplary embodiment of the present invention, the selection output shaft may include the second output shaft OUT2. However, it may also be possible to configure the first output shaft OUT1 to be the selection output shaft.

The drive gears for the shift range and the driven gears for the shift range may be provided to form the remaining shift ranges except for the lowest shift range and the highest shift range among the entire shift ranges which may be implemented by the DCT.

For reference, the DCT of the exemplary embodiment of the present invention is configured to implement a total of six forward shift ranges and R range as a reverse shift range, and the lowest shift range is a first shift range and the highest shift range is a sixth shift range. The drive gears for the shift range and the driven gears for the shift range, as described above, implement the second shift range and the fifth shift range, and as will be described later, a third shift range may be implemented by a first drive gear D1, a first driven gear P1, a first synchronizer 1SH and a fourth shift range may be implemented by a second drive gear D2, a second driven gear P2 and a second synchronizer 2SH.

The lowest shift range and the highest shift range are configured to be implemented by the drive gears for the shift range and the driven gears for the shift range in a state of connecting the first driven gear P1 and the second driven gear P2 by the sleeve synchronizer ST.

That is, it is configured that the power transmitted from the first input shaft IN1 may be transmitted to the first output shaft OUT1 through any one of the drive gears for the shift range disposed on the second input shaft IN2 and the driven gears for the shift range engaged with the drive gears for the shift range after transmitted to the second input shaft IN2 through the first driven gear P1 and the second driven gear P2 when implementing the lowest shift range.

Figure 2:
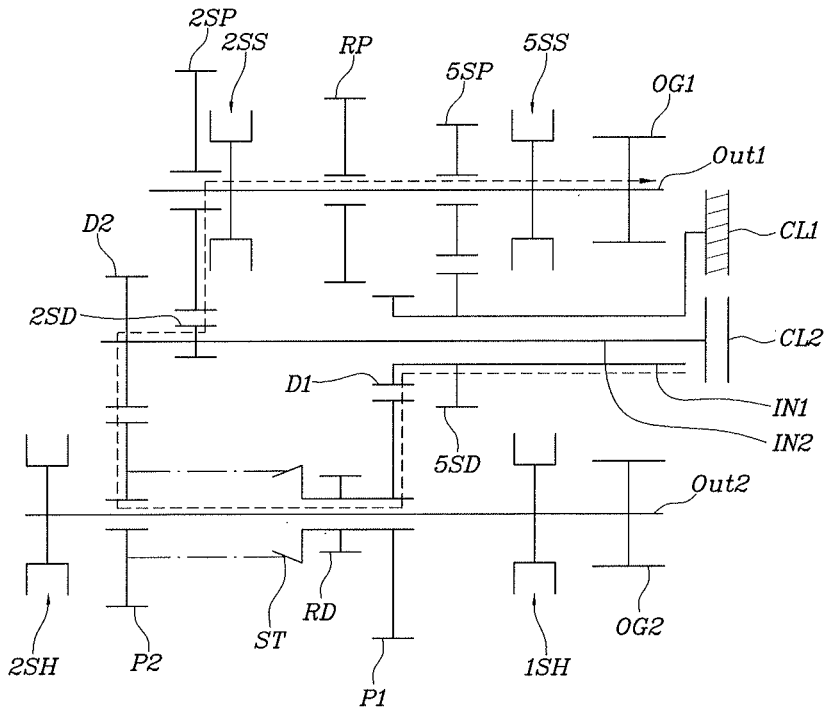
FIG. 2 is a drawing explaining the implementation of the first shift range by the various exemplary embodiments of FIG. 1.
Figure 3:
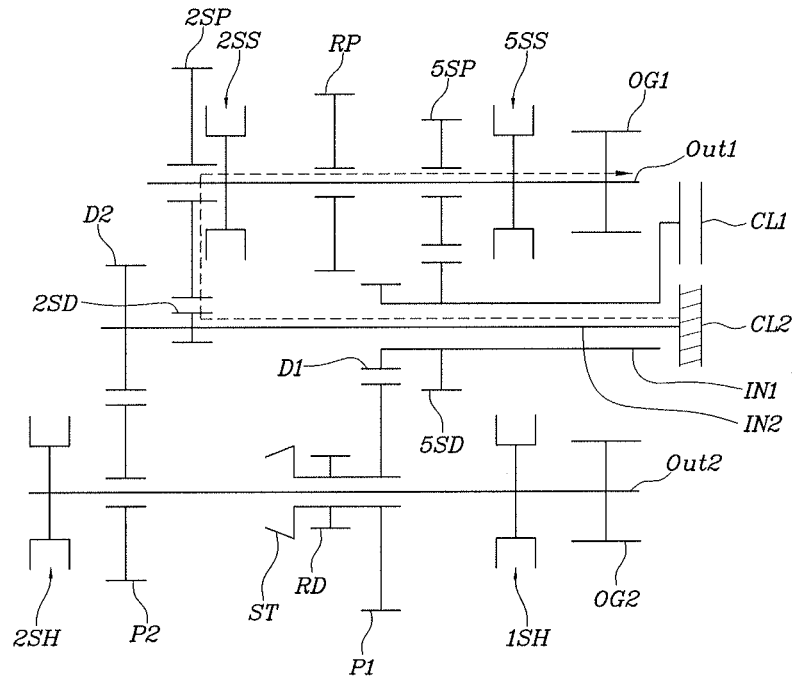
FIG. 3 is a drawing explaining the implementation of the second shift range by the various exemplary embodiments of FIG. 1.
Figure 4:
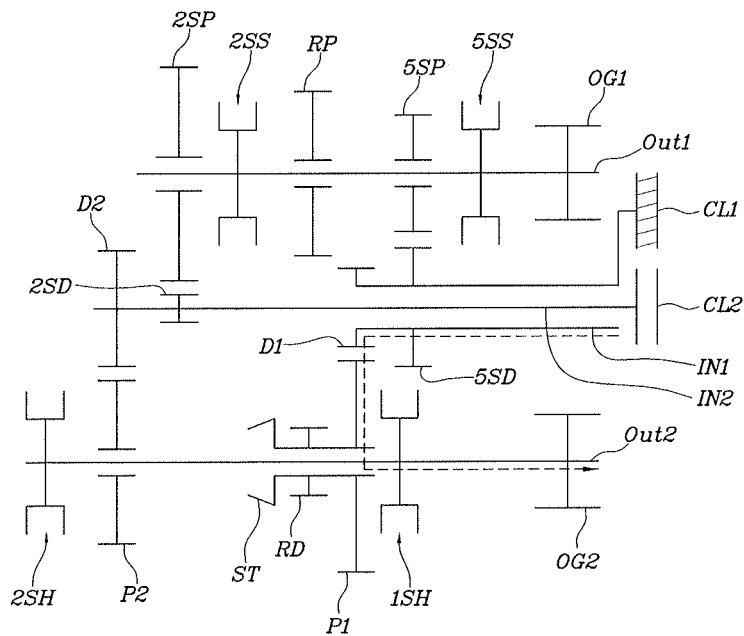
FIG. 4 is a drawing explaining the implementation of the third shift range by the various exemplary embodiments of FIG. 1.
Figure 5:
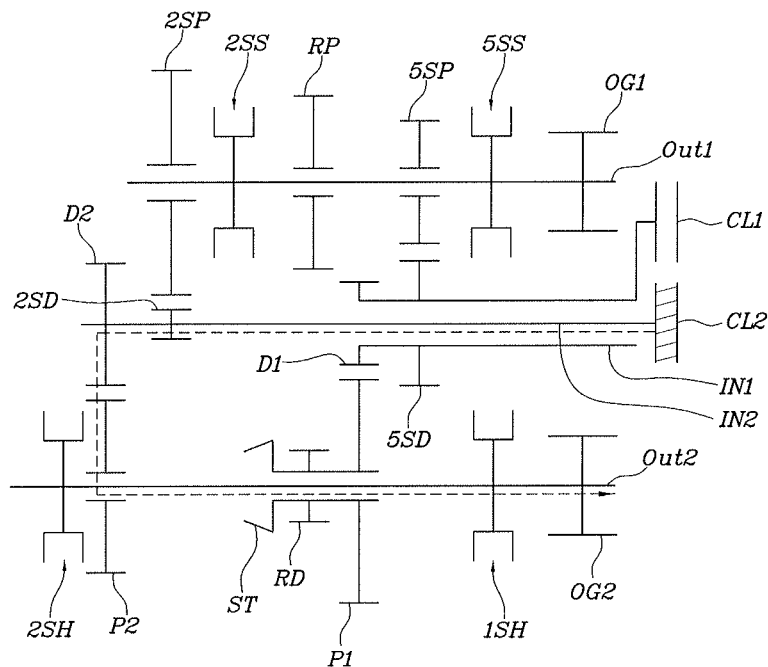
FIG. 5 is a drawing explaining the implementation of the fourth shift range by the various exemplary embodiments of FIG. 1.
Figure 6:
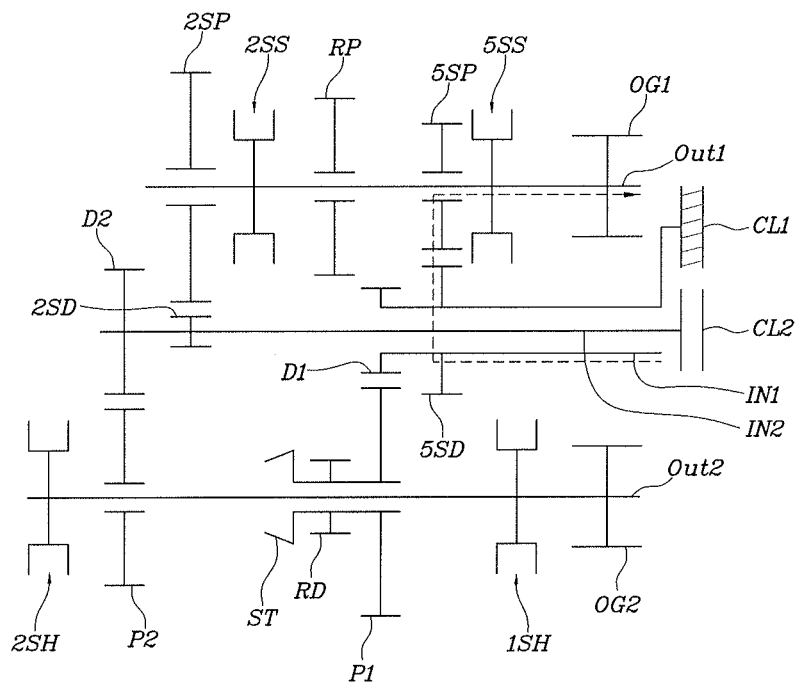
FIG. 6 is a drawing explaining the implementation of the fifth shift range by the various exemplary embodiments of FIG. 1.

FIG. 2 shows a state of implementing the first range in the exemplary embodiment of the present invention. The sleeve synchronizer ST connects the first driven gear P1 and the second driven gear P2 each other, and the synchronizer 2SS for the second range connects the driven gear 2SP for the second range to the first output shaft OUT1, so that the power input to the first input shaft IN1 through the first clutch CL1 from the power source sequentially passes through the first drive gear D1, the first driven gear P1, the sleeve synchronizer ST, the second driven gear P2, the second drive gear D2, the second input shaft IN2, the drive gear 2SD for the second range, the driven gear 2SP for the second range, the synchronizer 2SS for the second range and the first output shaft OUT1 to be shifted to the first range.

That is, the present invention implements the first range as the lowest shift range by combining a transmission gear ratio of other shift range without preparing a separate drive gear, driven gear and synchronizer for the first range for implementing the first range, reducing the number of portions to reduce the overall length and the weight of the transmission.

Furthermore, it is configured that the power transmitted from the second input shaft IN2 may be transmitted to the first input shaft IN1 through the second driven gear P2 and the first driven gear P1 and then, transmitted to the first output shaft OUT1 through any one of the drive gears for the shift range disposed on the first input shaft IN1 and the driven gears for the shift range engaged with the drive gears for the shift range when implementing the highest shift range.

Figure 7:
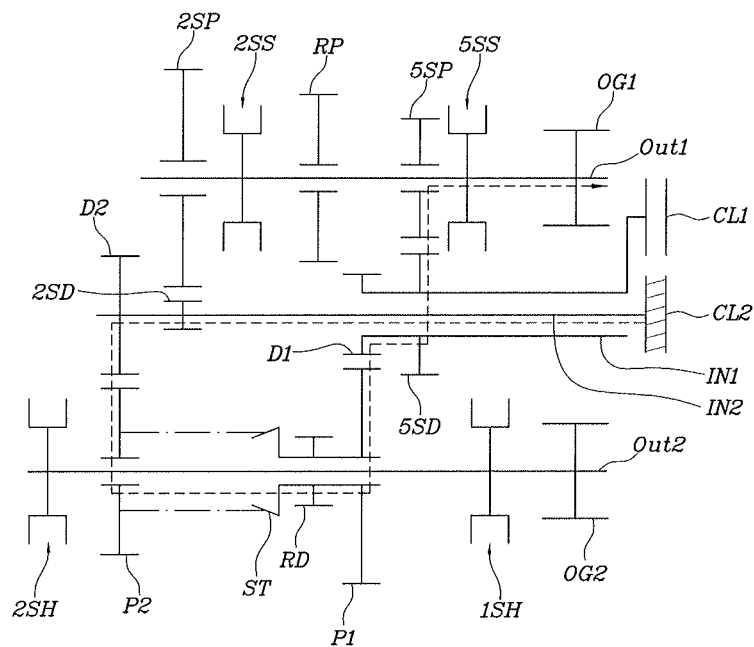
FIG. 7 is a drawing explaining the implementation of the sixth shift range by the various exemplary embodiments of FIG. 1.

FIG. 7 shows a state of implementing the sixth range in the exemplary embodiment of the present invention. In a state that the sleeve synchronizer ST connects the first driven gear P1 and the second driven gear P2 and the synchronizer 5SS for the fifth range connects the driven gear 5SP for the fifth range to the first output shaft OUT1, the power input to the second input shaft IN2 from the power source through the second clutch CL2 sequentially passes through the second drive gear D2, the second driven gear P2, the sleeve synchronizer ST, the first driven gear P1, the first drive gear D1, the first input shaft IN1, the drive gear for the fifth range 5SD, the driven gear for the fifth range 5SP, the synchronizer for the fifth range 5SS and the first output shaft OUT1 to be shift the sixth range.

That is, the present invention implements the sixth range as the highest shift range by combining gears and synchronizers for implementing other shift range without preparing a separate gear or synchronizer for the sixth range only for implementing the sixth range, reducing the overall length of the transmission by reducing the number of portions and improving fuel efficiency by reducing the weight of the transmission.

On the other hand, the second output shaft OUT2 as the selection output shaft provided with the first driven gear P1 and the second driven gear P2 may be provided with a first synchronizer 1SH which can connect or disconnect the first driven gear P1 to or from the selection output shaft; and a second synchronizer 2SH which can connect or disconnect the second driven gear P2 to or from the selection output shaft.

The first drive gear D1 and the first driven gear P1, the second drive gear D2 and the second driven gear P2 are configured to form any one of shift range among the remaining shift ranges except for the lowest shift range and the highest shift range, respectively.

That is, the first drive gear D1 and the first driven gear P1 are configured to implement a third shift range by the first synchronizer 1SH, and the second drive gear D2 and the second driven gear P2 are configured to implement a fourth shift range by the second synchronizer 2SH.

In other words, the first drive gear D1 and the first driven gear P1, the second drive gear D2 and the second driven gear P2 may form the third shift range and the fourth shift range, respectively, and may be also used to implement the first range as the lowest shift range and the sixth range as the highest shift range.

Of course, the exemplary embodiment of the present invention assumes that the highest shift range is the sixth range but the present invention is not limited to this. The lowest shift range may become the first range and the highest shift range may become a ninth range when configuring the shift ranges between the lowest shift range and the highest shift range, for example, to seven ranges while implementing the lowest shift range and the highest shift range by combining transmission gear ratios of the shift ranges connected by the sleeve synchronizer ST as described above, and when configuring the shift ranges between the lowest shift range and the highest shift range, for example, to eight ranges, the highest shift range may become a tenth range.

For reference, the transmission gear ration of the first range in the exemplary embodiment of the present invention may be implemented by multiplying a gear ratio between the first drive gear D1 and first driven gear P1, a gear ratio between the second driven gear P2 and second drive gear D2 and a rear ratio between the drive gear 2SD for the second range and the driven gear 2SP for the second range, and the transmission gear ration of the sixth range may be implemented by multiplying a gear ratio between the second drive gear D2 and second driven gear P2, a gear ratio between the driven gear for the first range and drive gear for the first range and a gear ratio between the drive gear 5SD for the fifth range and driven gear 5SP for the fifth range.

Figure 8:
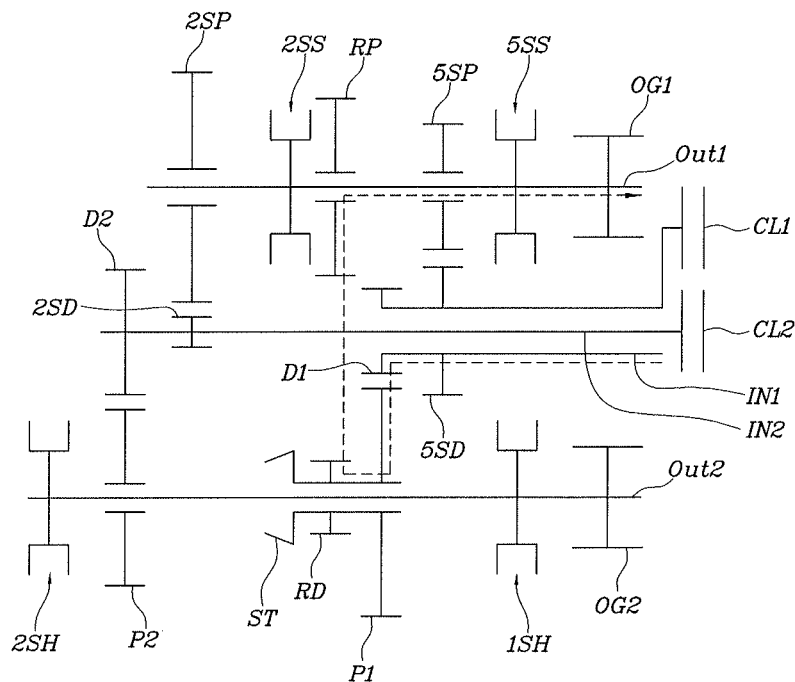
FIG. 8 is a drawing explaining the implementation of the R shift range by the various exemplary embodiments of FIG. 1.

For reference, FIG. 8 shows a state of implementing R range as a reverse shift range in the exemplary embodiment of the present invention. For implementing R range, the first driven gear P1 may be integrally provided with a reverse drive gear RD, a reverse driven gear RP engaged with the reverse drive gear RD disposed on the first output shaft OUT1 to be rotatable. When connecting the reverse driven gear RP to the first output shaft OUT1 by use of the synchronizer 2SS for the second range, the power transmitted to the first input shaft IN1 is output to the first output shaft OUT1 while forming the R range through the first drive gear D1, first driven gear P1, reverse drive gear RD, reverse driven gear RP and synchronizer 2SS for the second range.

Figure 9:
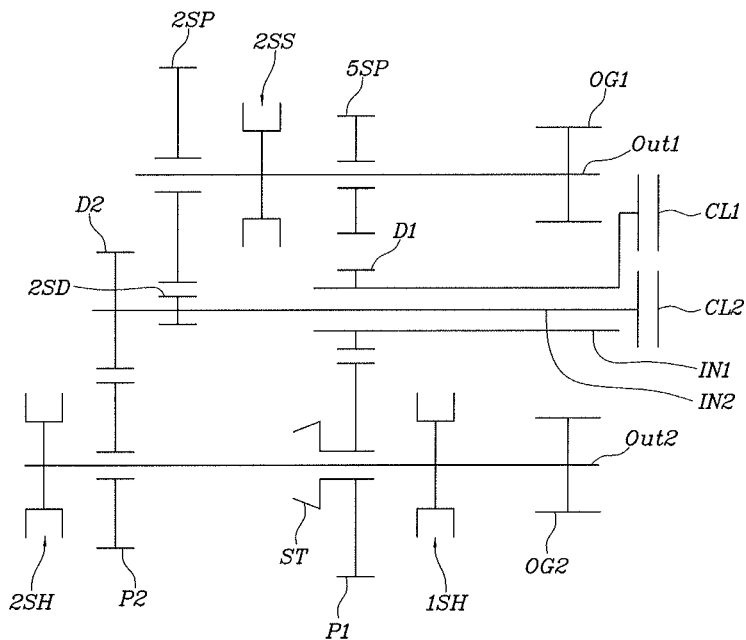
FIG. 9 is a drawing showing the various exemplary embodiments of a DCT for a vehicle according to an exemplary embodiment of the present invention.

FIG. 9 shows the various exemplary embodiments of the present invention. Comparing to the case of using a motor as the power source, it is to configure a simpler DCT by removing portions for implementing the R range in the various exemplary embodiments.

At the present case, the synchronizer 5SS for fifth range is also removed, the synchronizer 2SS for the second range has the function of connecting the driven gear 2SP for the second range to the first output shaft OUT1 and the function of connecting the driven gear 5SP for the fifth range to the first output shaft OUT1, and the reverse driving may be implemented by rotating the motor reversely while implementing the first range.

Figure 10:
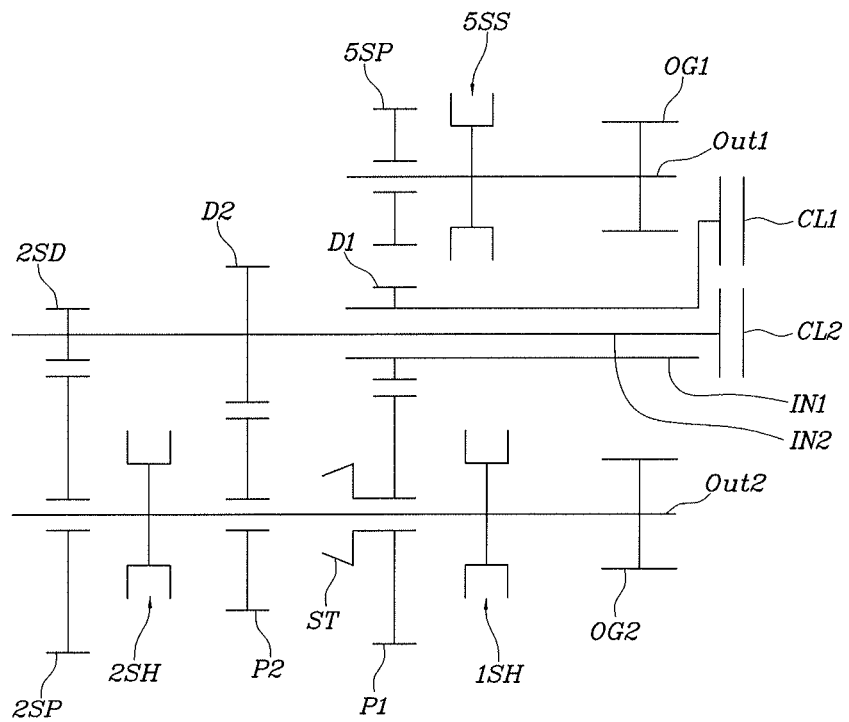
FIG. 10 is a drawing showing the various exemplary embodiments of a DCT for a vehicle according to an exemplary embodiment of the present invention.

FIG. 10 shows the various exemplary embodiments of the present invention. Comparing to the various exemplary embodiments of the present invention, the second driven gear P2, which is disposed on the first output shaft OUT1 in the various exemplary embodiments of the present invention, is disposed on second output shaft OUT2, the second synchronizer 2SH may have additionally function of selectively connecting the second driven gear P2 to the second output shaft OUT2, so that it is a structure which may be utilized in a case that the overall length of the portion where the first output shaft OUT1 is positioned is in an unfavorable position.

For convenience in explanation and accurate definition in the appended claims, the terms "upper", "lower", "inner", "outer", "up", "down", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A double clutch transmission (DCT) for a vehicle, the DCT comprising:
   a first input shaft and a second input shaft configured to change states receiving power from a same power source, respectively;
   a first output shaft and a second output shaft each mounted in parallel with the first input shaft;
   a first joint drive gear mounted on and rotated with the first input shaft;
   a second joint drive gear mounted on and rotated with the second input shaft;
   a first joint driven gear engaged with the first joint drive gear and rotatably mounted on a selection output shaft which is one of the first output shaft and the second output shaft;
   a second joint driven gear engaged with the second joint drive gear and rotatably mounted on the selection output shaft; and
   a sleeve synchronizer configured for selectively connecting between the first joint driven gear and the second joint driven gear,
   wherein the first input shaft and the second input shaft are provided with at least one shifting drive gear for a shift range, respectively,
   wherein at least one of the first output shaft and the second output shaft is provided with a plurality of shifting driven gears for a shift range which are engaged with the at least one shifting drive gear for the shift range to form respective shift range,
   wherein the at least one shifting drive gear and the plurality of shifting driven gears are provided to form remaining shift ranges except for a lowest shift range and a highest shift range among an entire shift ranges which is implemented by the DCT,
   wherein the lowest shift range and the highest shift range are implemented by the at least one shifting drive gear and the plurality of shifting driven gears in a state of connecting the first joint driven gear to the second joint driven gear by the sleeve synchronizer, wherein the selection output shaft is the second output shaft, and wherein when implementing the lowest shift range, the power transmitted from the first input shaft is transmitted to the second input shaft through the first joint driven gear and the second joint driven gear and then, transmitted to the first output shaft through one of the at least one shifting drive gear mounted on the second input shaft and the plurality of shifting driven gears engaged with the at least one shifting drive gear.

2. The DCT for the vehicle of claim 1, wherein the selection output shaft on which the first joint driven gear and the second joint driven gear are mounted includes:

a first joint synchronizer which selectively connects the first joint driven gear to or from the selection output shaft; and a second joint synchronizer which selectively connects the second joint driven gear to or from the selection output shaft.

3. The DCT for the vehicle of claim 2, wherein the at least one shifting drive gear for the shift range is mounted on and rotated with the first input shaft or the second input shaft;

wherein the plurality of shifting driven gears is mounted on the first output shaft or the second output shaft to be rotatable; and wherein the first output shaft or the second output shaft is provided with a shifting synchronizer for a shift range which is configured to selectively connect the plurality of shifting driven gears to the first output shaft or the second output shaft for the shift range.

4. A double clutch transmission (DCT) for a vehicle, the DCT comprising:

a first input shaft and a second input shaft configured to change states receiving power from a same power source, respectively;

a first output shaft and a second output shaft each mounted in parallel with the first input shaft;

a first joint drive gear mounted on and rotated with the first input shaft;

a second joint drive gear mounted on and rotated with the second input shaft;

a first joint driven gear engaged with the first joint drive gear and rotatably mounted on a selection output shaft which is one of the first output shaft and the second output shaft;

a second joint driven gear engaged with the second joint drive gear and rotatably mounted on the selection output shaft; and a sleeve synchronizer configured for selectively connecting between the first joint driven gear and the second joint driven gear, wherein the first input shaft and the second input shaft are provided with at least one shifting drive gear for a shift range, respectively, wherein at least one of the first output shaft and the second output shaft is provided with a plurality of shifting driven gears for a shift range which are engaged with the at least one shifting drive gear for the shift range to form respective shift range, wherein the at least one shifting drive gear and the plurality of shifting driven gears are provided to form remaining shift ranges except for a lowest shift range and a highest shift range among an entire shift ranges which is implemented by the DCT, wherein the lowest shift range and the highest shift range are implemented by the at least one shifting drive gear and the plurality of shifting driven gears in a state of connecting the first joint driven gear to the second joint driven gear by the sleeve synchronizer, wherein the selection output shaft is the second output shaft, and wherein when implementing the highest shift range, the power transmitted from the second input shaft is transmitted through the second joint driven gear and the first joint driven gear to the first input shaft and then, transmitted to the first output shaft through one of the at least one shifting drive gear mounted on the first input shaft and the plurality of shifting driven gears engaged with the at least one shifting drive gear.

5. The DCT for the vehicle of claim 1, wherein the first joint drive gear and the first joint driven gear, the second joint drive gear and the second joint driven gear are respectively configured to form one of shift range among remaining shift ranges except for the lowest shift range and the highest shift range.

* * * * *